United States Patent
Nabuurs et al.

(10) Patent No.: US 11,214,675 B2
(45) Date of Patent: Jan. 4, 2022

(54) AQUEOUS BINDER COMPOSITION

(71) Applicant: COVESTRO (NETHERLANDS) B.V., Nieuwegein (NL)

(72) Inventors: Tijs Nabuurs, Echt (NL); Willem-Jan Soer, Echt (NL); Maud Kastelijn, Echt (NL)

(73) Assignee: COVESTRO (NETHERLANDS) B.V., Nieuwegein (NL)

( * ) Notice: Subject to any disclaimer, the term of this patent is extended or adjusted under 35 U.S.C. 154(b) by 323 days.

(21) Appl. No.: 16/079,584

(22) PCT Filed: Mar. 6, 2017

(86) PCT No.: PCT/EP2017/055207
§ 371 (c)(1),
(2) Date: Aug. 24, 2018

(87) PCT Pub. No.: WO2017/153350
PCT Pub. Date: Sep. 14, 2017

(65) Prior Publication Data
US 2021/0179836 A1     Jun. 17, 2021

(30) Foreign Application Priority Data
Mar. 7, 2016 (EP) .................................... 16158997

(51) Int. Cl.
| | | |
|---|---|---|
| *C08L 33/12* | (2006.01) | |
| *C09D 151/00* | (2006.01) | |
| *C08F 2/38* | (2006.01) | |
| *C08F 285/00* | (2006.01) | |
| *C08F 265/06* | (2006.01) | |

(52) U.S. Cl.
CPC .............. *C08L 33/12* (2013.01); *C08F 2/38* (2013.01); *C08F 265/06* (2013.01); *C08F 285/00* (2013.01); *C09D 151/003* (2013.01)

(58) Field of Classification Search
CPC .... C08F 2/001; C08F 2/38–42; C08F 220/06; C08F 220/18–1818; C08F 265/00–06
See application file for complete search history.

(56) References Cited

U.S. PATENT DOCUMENTS

| | | | | |
|---|---|---|---|---|
| 5,962,571 A | * | 10/1999 | Overbeek | ................ C08F 8/30 |
| | | | | 428/460 |
| 6,423,769 B1 | * | 7/2002 | Gerst | .................... C08F 265/06 |
| | | | | 524/460 |
| 2012/0252972 A1 | * | 10/2012 | Balk | ..................... C08F 265/06 |
| | | | | 524/809 |

FOREIGN PATENT DOCUMENTS

| | | |
|---|---|---|
| DE | 42 376 59 | 5/1994 |
| EP | 0 710 680 | 5/1996 |
| JP | 62-30162 | 2/1987 |
| JP | 62030162 | 2/1987 |
| JP | 2004-331911 | 11/2004 |
| WO | 95/29963 | 11/1995 |

OTHER PUBLICATIONS

Bahadur, P. and Sastry, N. V. Principles of Polymer Science. Alpha Science International Ltd. 2002. pp. 110-128. (Year: 2002).*
International Search Report for PCT/EP2017/055207, dated Jun. 2, 2017, 5 pages.
Written Opinion of the ISA for PCT/EP2017/055207, dated Jun. 2, 2017, 6 pages.

* cited by examiner

*Primary Examiner* — Stephen E Rieth
(74) *Attorney, Agent, or Firm* — Nixon & Vanderhye P.C.

(57) ABSTRACT

The present invention relates to a process for preparing an aqueous binder composition, as well as the aqueous binder composition comprising a carboxylic acid-functional vinyl polymer (polymer A) and vinyl polymer (polymer B).

20 Claims, No Drawings

AQUEOUS BINDER COMPOSITION

This application is the U.S. national phase of International Application No. PCT/EP2017/055207 filed 6 Mar. 2017, which designated the U.S. and claims priority to EP Patent Application No. 16158997.3 filed 7 Mar. 2016, the entire contents of each of which are hereby incorporated by reference.

The present invention relates to the field of acrylic polymers especially those useful in the preparation of coatings. In particular, the present invention relates to aqueous binder compositions comprising two vinyl polymers, i.e. vinyl polymer A and vinyl polymer B, whereby vinyl polymer A is obtained by emulsion polymerization, vinyl polymer A is more hydrophilic than vinyl polymer B, vinyl polymer A has a lower weight average molecular weight than vinyl polymer B and vinyl polymer B is obtained by emulsion polymerization in the presence of vinyl polymer A.

The use of such aqueous binder compositions containing polymer emulsions that are colloidally stabilized using low molecular weight and acid containing polymers, also known as polyelectrolyte stabilized polymer emulsions, is well known in the art for the provision of waterborne binder material in coating applications. This is especially the case for wood coatings, where low minimum film forming temperature, good blocking resistance and high surface hardness should be combined with high elongation at break.

WO95/29963 describes a process for preparing in situ a solvent-free aqueous cross-linkable polymer compositions by emulsion polymerization of a) a softer (Tg 25° C. less than "oligomer" B) olefinic hydrophobic polymer A in the presence of b) a harder ($T_g$ 10 to 125° C.) acid-functional "oligomer" B having cross-linking groups thereon; and then c) crosslinking the mixture of hard "oligomer" B and soft polymer A to form a composition with Koenig hardness of >=40 seconds and minimum film forming temperature (MFFT) of <=55° C.

There is however a need for waterborne coatings with even better mechanical properties, in particular elongation at break. This can normally be achieved by reduction of the glass transition temperature of the polymer binder which in general also results in reduction of surface hardness. Thus, the problem with the prior art composition as for example described in WO95/29963 is that they do not combine high surface hardness and high elongation at break in the resultant coatings, as these two properties would normally be expected to work against each other. Traditionally a gain in surface hardness in a film is offset by a reduction in the elastic properties of the film.

The object of the present invention is to provide aqueous binder compositions containing polymer emulsions that are colloidally stabilized using lower molecular weight and acid containing polymers, which are able to provide coatings with increased elongation at break while the surface hardness is still sufficiently high.

It has surprisingly been found that this object can be achieved with an aqueous binder composition obtained with a process comprising at least the following steps A) and B):
A) preparing a carboxylic acid-functional vinyl polymer (polymer A) by emulsion polymerisation of a monomer composition A, whereby monomer composition A comprises the following monomers:
   Ai) at least one carboxylic acid functional olefinically unsaturated monomer; and
   Aii) at least one olefinically unsaturated monomer different than Ai);

B) preparing a vinyl polymer (polymer B) by emulsion polymerization of a monomer composition B in the presence of Polymer A where the monomer composition B comprises the following monomer(s):
   Bi) at least one olefinically unsaturated monomer;
   Bii) optionally carboxylic acid functional olefinically unsaturated monomer different than Bi); and
where the acid value of polymer B is lower than the acid value of polymer A; where the weight average molecular weight (Mw) of polymer B is higher than the weight average molecular weight (Mw) of polymer A as determined by Size Exclusion Chromatography analysis;
where the weight ratio of polymer A to polymer B is in the range of from 5:95 to 95:5;
where at least part of the carboxylic acid groups of Polymer A are deprotonated to obtain ionic or potentially ionic water-dispersing groups;
whereby the monomer composition A comprises at least two monomer compositions A1 and A2 which differ in chain-transfer agent concentration, whereby the monomer composition A1 comprises at most 1 wt. % of chain-transfer agent (relative to the total monomer composition A1), the monomer composition A2 comprises at least 1 wt. % of chain-transfer agent and at most 3.5 wt. % of chain-transfer agent (relative to the total monomer composition A2) and whereby the difference in amount of chain-transfer agent between monomer composition A1 and monomer composition A2 is at least 0.5 wt. %, preferably at least 1 wt. %.

Surprisingly, we have now discovered that aqueous binder compositions obtained with the process according to the invention may result in exceptionally good properties, such as a very advantageous combination of increased elongation at break and surface hardness (compared to when applying a similar aqueous binder composition than the aqueous binder composition of the invention except that one monomeric composition A is applied that results in a polymer A with the same or substantially the same $T_g$ than when applying the two monomeric compositions A1 and A2 as defined in the present invention). It has surprisingly been found that the elongation at break increases while the surface hardness remains on a sufficient level or even at the same level or even increases. Designing such coatings is a difficult task, as normally the two above mentioned properties would be expected to work against each other.

The present invention relates to a process for preparing an aqueous binder composition as described above and below.

Methods for preparing vinyl polymers by emulsion polymerization are known in the art and are described in for example Handbook Emulsion Polymerization: Theory and Practice, 1975, by D. C. Blackley (ISBN 978-0-85334-627-2). The preparation of vinyl polymers by means of multistage emulsion polymerization is also familiar to the skilled person, see further for example WO95/29963 and EP710680.

JP patent publication JP6230162 describes vinylidene chloride copolymers prepared from OH containing vinyl compounds and other monomers, which copolymers are useful as binders for manufacturing recording tapes and video tapes. DE-A-4237659 describes binder compositions containing carboxyl group containing resins and one or more polyethers, polyesters, polyether/polyesters and/or (meth)acrylic copolymers with at least one alpha, beta-unsaturated group and at least one epoxy group per molecule. JP-A-2004331911 describes aqueous primer composition for polyolefin comprising (a) an aqueous polyolefin resin, (b) an aqueous polyurethane resin and (c) an aqueous crosslinking agent. None of these patent publications describe the process according to the present invention.

In one embodiment of the present invention, the polymer A has a gradient polymeric chain morphology. As used herein, a polymer having a gradient polymeric chain morphology is a polymer having a continually changing polymeric composition (content) along the polymeric chain. Polymer A with gradient polymeric chain morphology can be obtained by an emulsion polymerization process comprising simultaneously introducing monomer composition A1 and monomer composition A2 into a reactor where the rate of introduction of the monomer composition A1 varies with respect to the rate of introduction of the second monomer composition A2 and wherein the emulsion polymerization process further comprises polymerising the monomers introduced into the reactor. Alternatively and more preferably, polymer A with gradient polymeric chain morphology can be obtained by an emulsion polymerization process comprising introducing a monomer feed to a reactor, which monomer feed continually varies in its composition due to addition of monomer composition A1 to monomer composition A2 or due to addition of monomer composition A2 to monomer composition A1, and wherein the emulsion polymerization process further comprises polymerising the monomers introduced into the reactor. In a first embodiment for the alternative and more preferred embodiment for obtaining a polymer A with gradient polymeric chain morphology, monomer composition A1 is fed into the reactor at a certain rate. Simultaneously, monomer composition A2 is fed to monomer composition A1 at the same rate, resulting in a continual change in the compositional content of the reactants entering the polymerisation reactor. In a second embodiment for the alternative and more preferred embodiment for obtaining a polymer A with gradient polymeric chain morphology, monomer composition A2 is fed into the reactor at a certain rate. Simultaneously, monomer composition A1 is fed to monomer composition A2 at the same rate, resulting in a continual change in the compositional content of the reactants entering the polymerisation reactor.

In another and more preferred embodiment of the present invention, the monomer compositions A1 and A2 are fed sequentially to a polymerisation reactor, i.e. either firstly the monomer composition A1 is fed to the reactor and consecutively the monomer composition A2 is fed to the reactor or either firstly the monomer composition A2 is fed to the reactor and consecutively the monomer composition A1 is fed to the reactor. In the embodiment of the present invention wherein the monomer compositions A1 and A2 are fed sequentially to a polymerisation reactor, the monomeric composition A1 is preferably fed to the polymerisation reactor prior to the monomeric composition A2.

In the present invention, the acid-functional vinyl polymer A is prepared by emulsion polymerization in the presence of chain-transfer agent of at least two monomer compositions A1 and A2 which differ in chain-transfer agent concentration, whereby the monomer composition A1 comprises at most 1 wt. % of chain-transfer agent (relative to the total monomer composition A1), the monomer composition A2 comprises at least 1 wt. % of chain-transfer agent and at most 3.5 wt. % of chain-transfer agent (relative to the total monomer composition A2) and whereby the difference in amount of chain-transfer agent between the monomer composition A1 and the monomer composition A2 is at least 0.5 wt. %, preferably at least 1 wt. %, more preferably at least 1.5 wt. %. The chain-transfer agent is preferably selected from the group consisting of mercaptans, alkyl halogenides and any mixture thereof. More preferably, the chain-transfer agent is selected from the group consisting of mercaptans. More preferably the chain transfer agent is a mercaptan, selected from the group consisting of lauryl mercaptan, 3-mercaptopropionic acid, 2-mercapto ethanol, isooctyl thioglycolate, and any mixture thereof. Most preferred chain transfer agents are lauryl mercaptan, 3-mercapto propionic acid or a mixture thereof.

The weight ratio of monomer composition A1 to monomer composition A2 is preferably from 5:95 to 65:35, more preferably from 10:90 to 55:45

The emulsion polymerization to obtain Polymer A and Polymer B is a free-radical emulsion polymerization that is conducted using appropriate heating and agitation (stirring). The free-radical emulsion polymerization is usually effected at atmospheric pressure and a temperature in the range from 30 to 100° C. Suitable free-radical-yielding initiators include persulphates such as ammonium, K and Na salts of persulphate, or redox initiator systems; combinations such as t-butyl hydroperoxide or hydrogen peroxide or cumene hydroperoxide, with isoascorbic acid or sodium formaldehydesulphoxylate, and optionally FeEDTA are useful. The amount of initiator, or initiator system, is generally 0.05 to 3% based on the weight of total monomers charged.

The vinyl polymer A is obtained by free-radical emulsion polymerization of a monomer composition A that comprises (and thus monomer composition A1 and monomer composition A2 comprise) the following monomers:
Ai) at least one carboxylic acid functional olefinically unsaturated monomer; and
Aii) at least one olefinically unsaturated monomer different than Ai); and
Aiii) optionally at least one wet adhesion promoting olefinically unsaturated monomer different than Ai and Aii);
Aiv) optionally at least one olefinically unsaturated monomer comprising crosslinkable groups, different than Ai), Aii) and Aiii).

Preferably, the vinyl polymer (polymer A) is obtained by free-radical polymerization of a monomer composition A that comprises (and thus monomer compositions A1 and monomer composition A2 comprise) the following monomers:
Ai) from 5 to 15 wt. % of at least one carboxylic acid functional olefinically unsaturated monomer; and
Aii) from 85 to 95 wt. % of at least one olefinically unsaturated monomer different than Ai); and
Aiii) optionally at least one wet adhesion promoting olefinically unsaturated monomer different than Ai and Aii), in an amount of at most 10 wt. %, preferably in an amount of at most 6 wt. %;
Aiv) optionally at least one olefinically unsaturated monomer comprising crosslinkable groups, different than Ai), Aii) and Aiii), in an amount of at most 15 wt. %, preferably in an amount of at most 10 wt. %,
whereby the amounts are given relative to the total weight of monomers contained in (i.e. charged for the preparation of) Polymer A and whereby the summed amount of Ai), Aii), Aiii) and Aiv) is 100 wt. %. The acid value of Polymer A is preferably from 32 to 100 mg KOH/g of solid Polymer A and more preferably from 45 to 65 mg KOH/g of solid Polymer A. The acid value is calculated based on the monomers contained in Polymer A.

The vinyl polymer B is obtained by free-radical emulsion polymerization of a monomer composition B in the presence of Polymer A where the monomer composition B comprises the following monomer(s):
Bi) at least one olefinically unsaturated monomer;
Bii) optionally carboxylic acid functional olefinically unsaturated monomer different than Bi);
Biii) optionally wet adhesion promoting olefinically unsaturated monomer different than Bi) and Bii); and
Biv) optionally crosslinkable olefinically unsaturated monomer different than Bi), Bii) and Biii).

Preferably, the vinyl polymer B is obtained by free-radical emulsion polymerization of a monomer composition B in the presence of Polymer A where the monomer composition B comprises the following monomer(s):
Bi) from 87 to 100 wt. % of at least one olefinically unsaturated monomer;
Bii) optionally carboxylic acid functional olefinically unsaturated monomer, different than Bi), in an amount of at most 3 wt. %;
Biii) optionally olefinically unsaturated monomer with wet adhesion promoting groups, different than Bi) and Bii), in an amount of at most 5 wt. %, preferably in an amount of less than 2.5 wt. %; and
Biv) optionally olefinically unsaturated monomer comprising crosslinkable groups, different than Bi), Bii) and Biii), in an amount of at most 5 wt. %, preferably in an amount of less than 2.5 wt. %;
whereby the amounts are given relative to the total weight of monomers contained in (i.e. charged for the preparation of) Polymer B and whereby the summed amount of Bi), Bii), Biii) and Biv) is 100 wt. %. Polymer B preferably has an acid value of no more than 20 mg KOH/g of solid Polymer B, more preferably less than 6.5 mg KOH/g of solid Polymer B, more preferably less than 1 mg KOH/g of solid Polymer B, even more preferably Polymer B has an acid value of 0 mg KOH/g of solid Polymer B. The acid value is calculated based on the monomers contained in Polymer B.

Preferably, Polymer A has an acid value from 45 to 65 mg KOH/g of solid Polymer A and Polymer B has an acid value less than 6.5 mg KOH/g of solid Polymer B, more preferably less than 1 mg KOH/g of solid Polymer B, even more preferably Polymer B has an acid value of 0 mg KOH/g of solid Polymer B.

Vinyl polymer A needs to contain sufficient water-dispersing groups to render the vinyl polymer A partially or fully soluble in an aqueous medium (i.e. at least part of the carboxylic groups of Polymer A are deprotonated to obtain ionic or potentially ionic water-dispersing groups), if necessary by neutralisation of any carboxylic acid functional groups. As used herein, a potentially ionic water-dispersing group means a group which under the relevant conditions can be converted into an ionic group by salt formation. Neutralisation may be achieved for example by adjusting the pH of the aqueous medium. Suitable neutralising agents are bases, examples of which include organic bases such as trialkyl amines (e.g. triethyl amine, tributyl amine), morpholine and alkanol amines, and inorganic bases, examples of which include ammonia, NaOH, KOH and LiOH. Preferably the base is selected from the group consisting of ammonia, dimethyl ethanol amine or a mixture thereof. Preferably the neutralization is effected following step A.

Surfactants can be utilised in order to assist in the dispersion of the vinyl polymer A and/or vinyl polymer B in water (even if vinyl polymer A is self-dispersible). Suitable surfactants include conventional anionic and/or non-ionic surfactants and mixtures thereof such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Non-ionic surfactants include polyglycol ether compounds and preferably polyethylene oxide compounds as disclosed in "Non-Ionic Surfactants—Physical Chemistry" edited by M. J. Schick, M. Decker 1987. The amount of surfactant used is preferably 0.03 to 2% by weight based on the weight of vinyl polymer A and vinyl polymer B.

The carboxylic acid functional olefinically unsaturated monomers Ai) and, if present Bii), are preferably selected from the group consisting of acrylic acid, methacrylic acid, and β-carboxyethyl acrylate, citraconic acid, crotonic acid, fumaric acid, itaconic acid, monoalkyl ester of itaconic acid such as for example monomethyl itaconate, maleic acid, and potentially carboxylic acid functional olefinically unsaturated monomers such as itaconic anhydride or maleic anhydride, and combinations thereof; more preferably the carboxylic acid functional olefinically unsaturated monomer is acrylic acid, methacrylic acid, itaconic acid, fumaric acid and mixtures thereof. Most preferred carboxylic acid functional olefinically unsaturated monomer is methacrylic acid.

The monomers Aii) and Bi) are preferably selected from the group consisting of acrylates, methacrylates, arylalkylenes, dienes, vinyl esters, nitriles, olefinically unsaturated halides and any mixture thereof. Examples of suitable dienes are 1,3-butadiene and isoprene. An example of a suitable vinyl ester is vinyl acetate. Suitable arylalkylenes comprise (optionally hydrocarbo substituted) styrene and conveniently the optional hydrocarbo may be $C_{1-10}$hydrocarbyl, more conveniently $C_{1-4}$alkyl. Suitable arylalkylene monomers may be selected from: styrene, α-methyl styrene, vinyl toluene, t-butyl styrene, di-methyl styrene and/or mixtures thereof, especially styrene. Suitable nitriles are acrylonitrile and methacrylonitrile. Suitable olefinically unsaturated halides are vinyl chloride, vinylidene chloride and vinyl fluoride.

The monomers Aii) and Bi) are olefinically unsaturated monomers amenable for copolymerisation, but they do not include carboxylic acid functional olefinically unsaturated monomers (Ai). More preferably, the monomers Aii) and Bi) are selected from the group consisting of acrylates, methacrylates, arylalkylenes and any mixture thereof. Preferably the acrylate or methacrylate comprises hydrocarbo (meth)acrylate(s) and conveniently the hydrocarbo moiety may be $C_{1-20}$hydrocarbyl, more conveniently $C_{1-12}$alkyl, most conveniently $C_{1-10}$alkyl, for example $C_{1-8}$alkyl. Suitable (meth) acrylate(s) may be selected from: methyl (meth)acrylate, ethyl (meth)acrylate, 4-methyl-2-pentyl (meth) acrylate, 2-methylbutyl (meth) acrylate, isoamyl (meth)acrylate, sec-butyl (meth)acrylate, n-butyl (meth)acrylate, 2-ethylhexyl (meth)acrylate, lauryl (meth)acrylate, isodecyl (meth)acrylate, cyclohexyl (meth)acrylate and/or mixtures thereof.

Olefinically unsaturated monomers comprising crosslinkable groups (monomer Aiv) and monomer Biv)) are olefinically unsaturated monomers comprising functional groups for imparting crosslinkability when the aqueous binder composition is subsequently dried. The functional groups for providing crosslinkability are preferably selected from epoxy, hydroxyl, ketone and aldehyde groups. Comonomer(s) with functional groups (monomer Aiv) and monomer Biv)) for imparting crosslinkability is (are) preferably selected from glycidyl (meth)acrylate, hydroxyalkyl (meth) acrylates such as hydroxyethyl (meth)acrylate, acrolein, methacrolein and methyl vinyl ketone, the acetoacetoxy esters of hydroxyalkyl (meth)acrylates such as acetoacetoxyethyl (meth)acrylate, and keto-containing amides such as diacetone acrylamide. The functional group for providing crosslinkability is most preferably a ketone group. In case comonomer(s) with functional groups for imparting crosslinkability are applied in the present invention, the aqueous binder composition is preferably combined with a crosslinking agent (i.e. so that crosslinking takes place e.g. after the formation of a coating therefrom). For example, comonomer(s) with hydroxyl functional groups for imparting crosslinkability are used in combination with for example a polyisocyanate as crosslinking agent. Comonomer(s) with functional groups for imparting crosslinkability comprising ketone and/or aldehyde functional groups are used in combination with for example a polyamine or a polyhydrazide as crosslinking agent. An example of a suitable polyamine is isophorone diamine or a polyalkylene imine such as polyethylene imine, for example obtainable from BASF under the trade name Lupasol®. Examples of suitable polyhydrazides are adipic acid dihydrazide, oxalic acid dihydrazide, phthalic acid dihydrazide and terephthalic acid dihydrazide. A preferred polyhydrazide is adipic acid dihydrazide. A preferred combination of crosslinking agent and functional group for imparting crosslinkability when the aqueous binder composition is subsequently dried is the combination of adipic acid dihydrazide as crosslinking agent and at least one ketone group present in the comonomer with functional groups for imparting crosslinkability. Diacetone acrylamide (DAAM) is a preferred comonomer with ketone functional groups for use in combination with adipic acid dihydrazide. However in one embodiment of the present invention advantageously the vinyl copolymer A and vinyl copolymer B present in the aqueous binder composition according to the present invention are substantially free of, more advantageously have no olefinically unsaturated monomers comprising crosslinkable groups.

Monomers which may further improve the wet adhesion (monomer Aiii) and Biii) may further be used. Conveniently further improved wet adhesion may be obtained by copolymerization of at least one monomer selected from the group consisting of:
i) ketone or acetoacetoxy functional olefinically unsaturated monomer [such as DAAM (diacetone acrylamide), AAEM (acetoacetoxy ethylmethacrylate) and/or mixtures thereof],
ii) ureido functional olefinically unsaturated monomer, such as those available commercially under the trade names Plex 6852-0, Evonik, combinations and/or mixtures thereof),
iii) tertiary-amine functional olefinically unsaturated monomer [such as DMAEMA (dimethylamine ethylmethacrylate), and/or DMAEA (dimethylamine ethylacrylate)], and/or
iv) any suitable combination of i), ii) and iii) and/or mixtures thereof.

However in one embodiment of the present invention advantageously the vinyl copolymer A and vinyl copolymer B present in the aqueous binder composition according to the present invention are substantially free of, more advantageously have no, further wet adhesion promoting groups.

The solid/solid weight ratio of Polymer A to Polymer B is in the range of from 5:95 to 95:5. The solid/solid weight ratio of Polymer A to Polymer B is respectively preferably from 20 to 50 of A to from 50 to 80 of B; more preferably from 23 to 35 of A to from 65 to 77 of B; and most preferably from 26 to 31 of A to from 69 to 74 of B.

As used herein, the glass transition temperature is determined by calculation by means of the Fox equation. Thus the $T_g$ in degrees Kelvin, of a copolymer having "n" copolymerised comonomers is given by the weight fractions W of each comonomer type and the $T_g$'s of the homopolymers (in degrees Kelvin) derived from each comonomer according to the equation:

$$\frac{1}{T_g} = \frac{W_1}{T_{g_1}} + \frac{W_2}{T_{g_2}} + \ldots \ldots + \frac{W_n}{T_{g_n}}$$

The calculated $T_g$ in degrees Kelvin may be readily converted to ° C. If the hydrophobic vinyl Polymer B is a homopolymer, its $T_g$ is simply that of the polymerized monomer.

Preferably, the polymer A has a $T_g$ from 50° C. to 150° C., more preferably from 55° C. to 125° C., and even more preferably from 70° C. to 125° C.; and the $T_g$ of polymer B is from −40° C. to 10° C., more preferably from −30° C. to 5° C., and even more preferably from −20° C. to 0° C.

In one embodiment, the Polymer A has a $T_g$ from 50° C. to 150° C. and Polymer B has a $T_g$ from −40° C. to 10° C. In another and more preferred embodiment, the Polymer A has a $T_g$ from 55° C. to 125° C. and Polymer B has a $T_g$ from −30° C. to 5° C. In another and even more preferred embodiment, the Polymer A has a $T_g$ from 70° C. to 125° C. and Polymer B has a $T_g$ from −20° C. to 0° C.

In the present invention, the weight average molecular weight (Mw) of Polymer A is lower than the weight average molecular weight (Mw) of Polymer B.

The weight average molecular weight (Mw) is determined by SEC (Size Exclusion Chromatography) analysis performed on an Alliance Separation Module (Waters 2690), including a pump, autoinjector, degasser, and column oven. The eluent was tetrahydrofuran (THF) with the addition of 1.0 vol % acetic acid. The injection volume was 150 μl. The flow was established at 1.0 ml/min. Three PL MixedB (Polymer Laboratories) with a guard column (3 μm PL) were applied at a temperature of 40° C. The detection was performed with a differential refractive index detector (Waters 410). The sample solutions were prepared with a concentration of 20 mg solids in 8 ml THF (+1 vol % acetic acid), and the samples were dissolved for a period of 24 hours. Calibration is performed with eight polystyrene standards (polymer standard services), ranging from 500 to 4,000,000 gram/mol. The calculation was performed with Millenium 32 software (Waters) with a third order calibration curve. The obtained molar masses are polystyrene equivalent molar masses (gram/mol).

The weight average molecular weight ($M_w$) of Polymer A is preferably less than 100.000 Daltons and higher than 2.000 Daltons. More preferably, the weight average molecular weight ($M_w$) of Polymer A is less than 75.000 Daltons, more preferably less than 50.000 Daltons. Most preferably, the weight average molecular weight of Polymer A is from 10.000 to 35.000 Daltons.

The weight average molecular weight (Mw) of Polymer B is preferably at least 100.000 Daltons, preferably higher than 150.000 Daltons, more preferably higher than 200.000 Daltons.

The present invention further relates to aqueous binder composition obtainable or obtained by the process as described above.

The present invention further relates to an aqueous binder composition comprising a carboxylic acid-functional vinyl polymer (polymer A) and a vinyl polymer (polymer B) obtained by emulsion polymerization in the presence of polymer A, whereby the acid value of polymer B is lower than the acid value of polymer A;
the weight average molecular weight (Mw) of polymer B is higher than the weight average molecular weight (Mw) of polymer A as determined by Size Exclusion Chromatography analysis;

where the weight ratio of polymer A to polymer B is in the range of from 5:95 to 95:5;
at least part of the carboxylic acid groups of Polymer A are deprotonated to obtain ionic or potentially ionic water-dispersing groups,
which when applied as a coating gives a film having a König hardness higher than 50 seconds and an elongation at break higher than 185%, preferably higher than 200% and more preferably higher than 250%. A coating obtained by drying an aqueous binder composition containing polymer emulsions that are colloidally stabilized using lower molecular weight and acid containing polymers, which coating has a hardness higher than 50 seconds combined with an elongation at break higher than 185%, preferably higher than 200% and more preferably higher than 250% is hitherto not disclosed in the prior art. Such a combination of hardness and elongation at break is unique since it was expected that such a high elongation at break could not be combined with such a high surface hardness. It is known that increasing elongation at break can normally be achieved by reduction of the glass transition temperature of the polymer binder, however, this in general results in reduction of surface hardness. The König hardness and the elongation at break of the coating are measured as described herein.

The aqueous binder composition according to the invention is preferably further specified as described above.

The aqueous binder composition according to the invention or the aqueous binder composition obtained with the process according to the invention preferably has a total VOC level of less than 5000 ppm, more preferred less than 1000 ppm, and most preferred of less than 250 ppm.

Typically, the aqueous binder composition needs to be film forming at room temperature. For this purpose organic co-solvent may be needed. Preferably, the aqueous binder composition according to the invention requires less than 15 wt. % of organic co-solvent based on total composition for this purpose, more preferred less than 10 wt. %, even more preferred less than 5 wt. % and especially preferred 0 wt. % of organic co-solvent. The co-solvent may be used during the preparation of vinyl polymer A, vinyl polymer B or may be incorporated during the formulation of the aqueous binder composition. Preferably, the process for preparing the aqueous binder composition is effected in the absence of organic co-solvent. Preferably the total amount of polymer A and polymer B is at least 10 wt. %, preferably at least 15 wt. %, more preferably at least 20 wt. %, even more preferably at least 25 wt. % and at most 90 wt. %, preferably at most 85 wt. % (amount is given relative to the total amount of binders in the aqueous binder composition).

The aqueous coating composition of the invention may contain conventional ingredients, some of which have been mentioned above; examples include pigments, dyes, emulsifiers, surfactants, plasticisers, thickeners, heat stabilisers, levelling agents, anti-cratering agents, fillers, sedimentation inhibitors, UV absorbers, antioxidants, drier salts, co-solvents, wetting agents, matting agents and the like introduced at any stage of the production process of the aqueous binder composition or subsequently.

The present invention further relates to an aqueous coating composition comprising the aqueous binder composition as described above or comprising the aqueous binder composition obtainable or obtained with the process according to the invention.

The present invention further relates to a method of protective coating a substrate comprising the steps of applying the aqueous coating composition of the present invention to any substrate such as a substrate comprising a lignocellulosic material (such as wood or wood products) and/or aged alkyd resin and/or plastic such as polypropylene and/or metallic substrate, composite materials comprising glass, to form a coating thereon, and drying the coating to form a coated substrate. Preferred substrates are a substrate comprising a lignocellulosic material (such as wood or wood products) and/or aged alkyd resin.

Paints based on aqueous binder compositions according to the invention will preferably have a VOC concentration of less than 240 g/L, more preferred less than 130 g/L, and most preferred less than 80 g/L.

The present invention is now illustrated by the following examples. Unless otherwise specified all parts, percentages, and ratios are on a weight basis.

EXAMPLES AND COMPARATIVE EXPERIMENTS

Polymer A1: Preparation of Polymer A According to a Sequential Process Wherein the First Feed Contains 2 wt-% of 3-Mercaptopropionic Acid and the Second Feed does not Contain any Chain Transfer Agent To a round-bottomed flask equipped with a stirrer, condenser, nitrogen adapter and a thermocouple are added 970.4 parts of demineralized water and 2.8 parts of sodium lauryl sulphate (30% in water). The reactor contents are heated to 85° C. Once a temperature of 80° C. is reached 10% of an emulsified first monomer feed, consisting of 98.1 parts of demineralized water, 4.1 parts of sodium lauryl sulphate (30% in water), 17.5 parts of methacrylic acid, 201.3 parts of methyl methacrylate, and 4.4 parts of 3-mercaptopropionic acid, is added to the reactor, followed by a solution of 0.4 parts of ammonium persulphate in 19.9 parts of demineralized water.

As soon as a reaction temperature of 85° C. is reached the remaining first monomer feed is added over a period of 45 minutes. Simultaneously, 50% of an initiator solution of 0.9 parts of ammonium persulphate in 60.4 parts of demineralized water is added over a period of 45 minutes. At the end of both feeds, the reactor contents are stirred at 85° C. for 30 minutes.

Next, a second emulsified monomer feed consisting of 98.1 parts of demineralized water, 4.1 parts of sodium lauryl sulphate (30% in water), 17.5 parts of methacrylic acid, and 201.3 parts of methyl methacrylate is added over a period of 45 minutes. Simultaneously, the remaining part of the initiator solution is added over a period of 45 minutes.

At the end of both feeds, the reactor contents are again stirred for 30 minutes at 85° C. Next, the batch is cooled to 80° C. and a mixture of 38.1 parts of demineralized water and 34.9 parts of ammonia (25% solution in water) is added over a period of 15 minutes. The batch is stirred for another 20 minutes and cooled to room temperature. Solids content of Polymer A1 was corrected to 24% using demineralized water. The resulting emulsion has a solids content of 24%, a pH of 8.7, and a Brookfield viscosity of 50 mPa·s.

Polymer A2: Preparation of Polymer A According to a Sequential Process Wherein the First Feed Contains No Chain Transfer Agent and the Second Feed Contains 2 wt-% of 3-Mercaptopropionic Acid To prepare Polymer A2, the process for preparing Polymer A1 is repeated except that for Polymer A2 the first monomer feed consists of 98.1 parts of demineralized water, 4.1 parts of sodium lauryl sulphate (30% in water), 17.5 parts of methacrylic acid, and 201.3 parts of methyl methacrylate, and the second monomer feed consists of 98.1 parts of demineralized water, 4.1 parts of sodium lauryl sulphate (30% in water), 17.5 parts of methacrylic acid, 201.3 parts of methyl methacrylate, and 4.4 parts of 3-mercaptopropionic acid. The solids content of Polymer A2 was also corrected to 25% using demineralized water. The resulting emulsion has a solids content of 25%, a pH of 8.8, and a Brookfield viscosity of less than 10 mPa·s.

Polymer B1: Completion Polymerization of Polymer A1 with Polymer B Having $T_g$ of −20° C.

To a round-bottomed flask equipped with a stirrer, condenser, nitrogen adapter and a thermocouple are added 751.1 parts of Polymer A1. The reactor contents are heated to 60° C. At 60° C. 33.3% of a monomer mixture consisting of 149.9 parts of methyl methacrylate and 318.6 parts of butyl acrylate is added. After mixing for 15 minutes a mixture of 1.8 parts of demineralized water and 0.3 parts of t-butyl hydroperoxide (70 wt-% solution in water) is added, followed by 33% of a solution of 17.7 parts of demineralized water and 1.0 part of iso-ascorbic acid, which is adjusted to pH=8.5 with ammonia (25% solution in water). After a peak temperature of 86° C. is reached following an exothermic polymerization, the batch is stirred for 10 minutes at peak temperature. 76.5 parts of demineralized water is added and the batch is cooled to 60° C. 50% of the remaining monomer mixture is added, and the batch is stirred for another 15 minutes. A mixture of 1.8 parts of demineralized water and 0.3 parts of t-butyl hydroperoxide (70 wt-% solution in water) is added, followed 50% of the remaining iso-ascorbic acid/water mixture. After a peak temperature of 86° C. is again reached, the batch is stirred for 10 minutes at peak temperature. 104.5 parts of demineralized water are added and the batch is cooled to 60° C. The remaining parts of the monomer mixture are added after which the batch is again stirred for 15 minutes. A mixture of 2.8 parts of demineralized water and 0.3 parts of t-butyl hydroperoxide (70 wt-% solution in water) is added, followed by the addition of the remaining iso-ascorbic acid/water mixture. After a peak temperature of 86° C. is reached, the batch is stirred for 10 minutes after which the batch is cooled to room temperature. Finally, 27.5 parts of demineralized water and 7.6 parts of Proxel Ultra 10 are added. The resulting emulsion has a solids content of 41%, a pH of 8.2, and a Brookfield viscosity of 245 mPa·s.

Polymer B2: Completion Polymerization of Polymer A2 with Polymer B Having $T_g$ of −20° C.

To prepare Polymer B2, the process for preparing Polymer B1 is repeated except that for Polymer B2 Polymer A2 is used instead of Polymer A1. The resulting emulsion has a solids content of 36%, a pH of 8.4, and a Brookfield viscosity of 250 mPa·s.

Polymer B3: Completion Polymerization of Polymer A2 with Polymer B Having $T_g$ of 0° C.

To prepare Polymer B3, the process for preparing Polymer B2 is repeated except that for Polymer B3 a monomer mixture consisting of 220.2 parts of methyl methacrylate and 248.4 parts of butyl acrylate is used instead of a monomer mixture consisting of 149.9 parts of methyl methacrylate and 318.6 parts of butyl acrylate. The resulting emulsion has a solids content of 41%, a pH of 8.5, and a Brookfield viscosity of 1250 mPa·s.

Polymer A3: Preparation of Polymer A According to a Sequential Process Wherein the First Feed Contains 2.5 wt-% of 3-Mercaptopropionic Acid and the Second Feed Contains 0.5 wt-% of 3-Mercaptopropionic Acid To prepare Polymer A3, the process for preparing Polymer A1 is repeated except that for Polymer A3 the first monomer feed consists of 98.1 parts of demineralized water, 4.1 parts of sodium lauryl sulphate (30% in water), 17.5 parts of methacrylic acid, 201.3 parts of methyl methacrylate, and 5.5 parts of 3-mercaptopropionic acid and the second monomer feed consists of 98.1 parts of demineralized water, 4.1 parts of sodium lauryl sulphate (30% in water), 17.5 parts of methacrylic acid, 201.3 parts of methyl methacrylate, and 1.1 parts of 3-mercaptopropionic acid. Solids content of Polymer A3 was corrected to 23% using demineralized water. The resulting emulsion has a solids content of 23%, a pH of 8.4, and a Brookfield viscosity of 30 mPa·s.

Polymer A4: Preparation of Polymer A According to a Sequential Process Wherein the First Feed Contains 0.5 wt-% of 3-Mercaptopropionic Acid and the Second Feed Contains 2.5 wt-% of 3-Mercaptopropionic Acid To prepare Polymer A4, the process for preparing Polymer A1 is repeated except that for Polymer A4 the first monomer feed consists of 98.1 parts of demineralized water, 4.1 parts of sodium lauryl sulphate (30% in water), 17.5 parts of methacrylic acid, 201.3 parts of methyl methacrylate, and 1.1 parts of 3-mercaptopropionic acid and the second monomer feed consists of 98.1 parts of demineralized water, 4.1 parts of sodium lauryl sulphate (30% in water), 17.5 parts of methacrylic acid, 201.3 parts of methyl methacrylate, and 5.5 parts of 3-mercaptopropionic acid. Solids content of Polymer A4 was corrected to 24% using demineralized water. The resulting emulsion has a solids content of 24%, a pH of 8.5, and a Brookfield viscosity of 70 mPa·s.

Polymer A5: Preparation of Polymer a According to a Sequential Process Wherein the First Feed Contains No Chain Transfer Agent and the Second Feed Contains 1.6 wt-% of 3-Mercaptopropionic Acid and 0.8 wt-% of Lauryl Mercaptan To prepare Polymer A5, the process for preparing Polymer A1 is repeated except that for Polymer A4 the first monomer feed consists of 98.1 parts of demineralized water, 4.1 parts of sodium lauryl sulphate (30% in water), 17.5 parts of methacrylic acid, and 201.3 parts of methyl methacrylate and the second monomer feed consists of 98.1 parts of demineralized water, 4.1 parts of sodium lauryl sulphate (30% in water), 17.5 parts of methacrylic acid, 201.3 parts of methyl methacrylate, 3.5 parts of 3-mercaptopropionic acid, and 1.8 parts of lauryl mercaptan. Solids content of Polymer A5 was corrected to 24% using demineralized water. The resulting emulsion has a solids content of 24%, a pH of 8.4, and a Brookfield viscosity of 20 mPa·s.

Comparative Polymer A6: Preparation of Polymer a According to the Comparative Process with Only One Monomer Feed Containing 1.0 wt-% of 3-Mercaptopropionic Acid To a round-bottomed flask equipped with a stirrer, condenser, nitrogen adapter and a thermocouple are added 970.4 parts of demineralized water and 2.8 parts of sodium lauryl sulphate (30% in water). The reactor contents are heated to 85° C. Once a temperature of 80° C. is reached 5% of an emulsified monomer feed, consisting of 194.7 parts of demineralized water, 8.2 parts of sodium lauryl sulphate (30% in water), 35.0 parts of methacrylic acid, 402.7 parts of methyl methacrylate, and 4.4 parts of 3-mercaptopropionic acid, is added to the reactor, followed by a solution of 0.4 parts of ammonium persulphate in 19.9 parts of demineralized water.

As soon as a reaction temperature of 85° C. is reached the remaining monomer feed is added over a period of 90 minutes. Simultaneously, an initiator solution of 0.9 parts of ammonium persulphate in 60.4 parts of demineralized water is added over a period of 90 minutes. At the end of both feeds, the reactor contents are stirred at 85° C. for 30 minutes.

Next, the batch is cooled to 80° C. and a mixture of 38.1 parts of demineralized water and 34.9 parts of ammonia (25% solution in water) is added over a period of 15 minutes. The batch is stirred for another 20 minutes and cooled to room temperature. Solids content of Comparative Polymer A6 was corrected to 24% using demineralized water. The resulting emulsion has a solids content of 24%, a pH of 9.3, and a Brookfield viscosity of 30 mPa·s.

Comparative Polymer A7: Preparation of Polymer A According to the Comparative Process with Only One Monomer Feed Containing 1.5 wt-% of 3-Mercaptopropionic Acid To a round-bottomed flask equipped with a stirrer, condenser, nitrogen adapter and a thermocouple are added 969.3 parts of demineralized water and 2.7 parts of sodium lauryl sulphate (30% in water). The reactor contents are heated to 85° C. Once a temperature of 80° C. is reached 5% of an emulsified monomer feed, consisting of 194.5 parts of demineralized water, 8.2 parts of sodium lauryl sulphate (30% in water), 35.0 parts of methacrylic acid, 402.2 parts of methyl methacrylate, and 6.6 parts of 3-mercaptopropionic acid, is added to the reactor, followed by a solution of 0.4 parts of ammonium persulphate in 19.9 parts of demineralized water.

As soon as a reaction temperature of 85° C. is reached the remaining monomer feed is added over a period of 90 minutes. Simultaneously, an initiator solution of 0.9 parts of ammonium persulphate in 60.3 parts of demineralized water is added over a period of 90 minutes. At the end of both feeds, the reactor contents are stirred at 85° C. for 30 minutes.

Next, the batch is cooled to 80° C. and a mixture of 38.1 parts of demineralized water and 34.9 parts of ammonia (25% solution in water) is added over a period of 15 minutes. The batch is stirred for another 20 minutes and cooled to room temperature. Solids content of Comparative Polymer A7 was corrected to 24% using demineralized water. The resulting emulsion has a solids content of 24%, a pH of 9.0, and a Brookfield viscosity of 40 mPa·s.

Polymer A8: Preparation of Crosslinkable Polymer A According to a Sequential Process Wherein the First Feed Contains No Chain Transfer Agent and the Second Feed Contains 1.55 wt-% of 3-Mercaptopropionic Acid To a round-bottomed flask equipped with a stirrer, condenser, nitrogen adapter and a thermocouple are added 970.9 parts of demineralized water and 2.7 parts of sodium lauryl sulphate (30% in water). The reactor contents are heated to 85° C. Once a temperature of 80° C. is reached 10% of an emulsified first monomer feed, consisting of 97.4 parts of demineralized water, 4.1 parts of sodium lauryl sulphate (30% in water), 17.5 parts of methacrylic acid, and 201.4 parts of methyl methacrylate, is added to the reactor, followed by a solution of 0.4 parts of ammonium persulphate in 19.9 parts of demineralized water.

As soon as a reaction temperature of 85° C. is reached the remaining first monomer feed is added over a period of 45 minutes. Simultaneously, 50% of an initiator solution of 0.9 parts of ammonium persulphate in 60.4 parts of demineralized water is added over a period of 45 minutes. At the end of both feeds, the reactor contents are stirred at 85° C. for 30 minutes.

Next, a second emulsified monomer feed consisting of 97.4 parts of demineralized water, 4.1 parts of sodium lauryl sulphate (30% in water), 17.5 parts of methacrylic acid, 197.1 parts of methyl methacrylate, 4.4 parts of diacetone acrylamide, and 3.4 parts of 3-mercaptopropionic acid, is added over a period of 45 minutes. Simultaneously, the remaining part of the initiator solution is added over a period of 45 minutes.

At the end of both feeds, the reactor contents are again stirred for 30 minutes at 85° C. Next, the batch is cooled to 80° C. and a mixture of 38.1 parts of demineralized water and 34.9 parts of ammonia (25% solution in water) is added over a period of 15 minutes. The batch is stirred for another 20 minutes and cooled to room temperature. Solids content of Polymer A8 was corrected to 24% using demineralized water. The resulting emulsion has a solids content of 24%, a pH of 8.9, and a Brookfield viscosity of 15 mPa·s.

Polymer A9: Preparation of Polymer A Comprising Wet Adhesion Monomer According to a Sequential Process Wherein the First Feed Contains No Chain Transfer Agent and the Second Feed Contains 2 wt-% of 3-Mercaptopropionic Acid To a round-bottomed flask equipped with a stirrer, condenser, nitrogen adapter and a thermocouple are added 970.4 parts of demineralized water and 2.8 parts of sodium lauryl sulphate (30% in water). The reactor contents are heated to 85° C. Once a temperature of 80° C. is reached 10% of an emulsified first monomer feed, consisting of 84.2 parts of demineralized water, 4.1 parts of sodium lauryl sulphate (30% in water), 17.5 parts of methacrylic acid, 26.3 parts of hydroxyethylethyleneurea (Plex 6852-0), and 188.2 parts of methyl methacrylate, is added to the reactor, followed by a solution of 0.4 parts of ammonium persulphate in 19.9 parts of demineralized water.

As soon as a reaction temperature of 85° C. is reached the remaining first monomer feed is added over a period of 45 minutes. Simultaneously, 50% of an initiator solution of 0.9 parts of ammonium persulphate in 60.4 parts of demineralized water is added over a period of 45 minutes. At the end of both feeds, the reactor contents are stirred at 85° C. for 30 minutes.

Next, a second emulsified monomer feed consisting of 84.2 parts of demineralized water, 4.1 parts of sodium lauryl sulphate (30% in water), 17.5 parts of methacrylic acid, 188.2 parts of methyl methacrylate, 26.3 parts of hydroxyethylethyleneurea (Plex6852-0), and 4.4 parts of 3-mercaptopropionic acid, is added over a period of 45 minutes. Simultaneously, the remaining part of the initiator solution is added over a period of 45 minutes.

At the end of both feeds, the reactor contents are again stirred for 30 minutes at 85° C. Next, the batch is cooled to 80° C. and a mixture of 38.1 parts of demineralized water and 34.9 parts of ammonia (25% solution in water) is added over a period of 15 minutes. The batch is stirred for another 20 minutes and cooled to room temperature. Solids content of Polymer A9 was corrected to 25% using demineralized water. The resulting emulsion has a solids content of 25%, a pH of 8.6, and a Brookfield viscosity of 70 mPa·s.

Polymer B4: Completion Polymerization of Polymer A3 with Polymer B Having Tg of −20° C.

To prepare Polymer B4, the process for preparing Polymer B1 is repeated except that for Polymer B4 Polymer A3 is used instead of Polymer A1. The resulting emulsion has a solids content of 43%, a pH of 8.1, and a Brookfield viscosity of 150 mPa·s.

Polymer B5: Completion Polymerization of Polymer A4 with Polymer B Having Tg of −20° C.

To prepare Polymer B5, the process for preparing Polymer B1 is repeated except that for Polymer B5 Polymer A4 is used instead of Polymer A1. The resulting emulsion has a solids content of 41%, a pH of 8.2, and a Brookfield viscosity of 55 mPa·s.

Polymer B6: Completion Polymerization of Polymer A5 with Polymer B Having Tg of −20° C.

To prepare Polymer B6, the process for preparing Polymer B1 is repeated except that for Polymer B6 Polymer A5 is used instead of Polymer A1. The resulting emulsion has a solids content of 43%, a pH of 8.0, and a Brookfield viscosity of 4000 mPa·s.

Polymer B9: Completion Polymerization of Crosslinkable Polymer A8 with Polymer B Having Tg of −20° C.

To a round-bottomed flask equipped with a stirrer, condenser, nitrogen adapter and a thermocouple are added 751.1 parts of Polymer A1. The reactor contents are heated to 60° C. At 60° C. 33.3% of a monomer mixture consisting of 147.6 parts of methyl methacrylate, 2.3 parts of diacetone acrylamide, and 318.6 parts of butyl acrylate is added. After mixing for 15 minutes a mixture of 1.8 parts of demineralized water and 0.3 parts of t-butyl hydroperoxide (70 wt-% solution in water) is added, followed by 33% of a solution of 17.7 parts of demineralized water and 1.0 part of iso-ascorbic acid, which is adjusted to pH=8.5 with ammonia (25% solution in water). After a peak temperature of 86° C. is reached following an exothermic polymerization, the batch is stirred for 10 minutes at peak temperature. 76.5 parts of demineralized water is added and the batch is cooled to 60° C. 50% of the remaining monomer mixture is added, and the batch is stirred for another 15 minutes. A mixture of 1.8 parts of demineralized water and 0.3 parts of t-butyl hydroperoxide (70 wt-% solution in water) is added, followed 50% of the remaining iso-ascorbic acid/water mixture. After a peak temperature of 86° C. is again reached, the batch is stirred for 10 minutes at peak temperature. 104.5 parts of demineralized water are added and the batch is cooled to 60° C. The remaining parts of the monomer mixture are added after which the batch is again stirred for 15 minutes. A mixture of 2.8 parts of demineralized water and 0.3 parts of t-butyl hydroperoxide (70 wt-% solution in water) is added, followed by the addition of the remaining iso-ascorbic acid/water mixture. After a peak temperature of 86° C. is reached, the batch is stirred for 10 minutes after which the batch is cooled to room temperature. Finally, 27.5 parts of demineralized water, 1.9 parts of adipic dihydrazide, and 7.6 parts of Proxel Ultra 10 are added. The resulting emulsion has a solids content of 31%, a pH of 8.4, and a Brookfield viscosity of 6500 mPa·s.

Polymer B10: Completion Polymerization of Polymer A9 with Polymer B Having Tg of −20° C.

To prepare Polymer B10, the process for preparing Polymer B1 is repeated except that for Polymer B10 Polymer A9 is used instead of Polymer A1. The resulting emulsion has a solids content of 36%, a pH of 8.3, and a Brookfield viscosity of 4500 mPa·s.

Comparative Polymer B7: Completion Polymerisation of Comparative Polymer A6 with Polymer B Having Tg of −20° C.

To prepare Comparative Polymer B7, the process for preparing Polymer B1 is repeated except that for Comparative Polymer B7 Comparative Polymer A6 is used instead of Polymer A1. The resulting emulsion has a solids content of 39%, a pH of 8.5 and a Brookfield viscosity of 85 mPa·s.

Comparative Polymer B8: Completion Polymerisation of Comparative Polymer A7 with Polymer B Having Tg of −20° C.

To prepare Comparative Polymer B8, the process for preparing Polymer B1 is repeated except that for Comparative Polymer B8 Comparative Polymer A7 is used instead of Polymer A1. The resulting emulsion has a solids content of 41%, a pH of 8.3, and a Brookfield viscosity of 100 mPa·s.

Formulations

Formulations were prepared by adding 2.5 wt. % butyldiglycol to the aqueous binder dispersion of Polymers B1-B6, Comparative Polymers B7 and B8, Polymer B9 and Polymer B10 prepared as described above. Butyldiglycol was diluted 1:1 on weight with water and a droplet of ammonia was added. Viscosity of the formulated resin was adjusted to 20-30 s DIN cup 4 with the thickener Borchigel L75 (1:1 with water).

Determination of König Hardness

König hardness as used herein is a standard measure of surface hardness, being a determination of how the visco-elastic properties of a film formed from the composition slows down a swinging motion deforming the surface of the film, and is measured according to DIN 53157 using an Erichsen™ hardness equipment, wherein films were cast on glass plate at $80 \times 10^{-6}$ meter (=80 micron) wet film thickness at room temperature and allowed to stand for 60 minutes. The films were then transferred to an oven at 50° C. and left for 16 hours. The results are expressed as König seconds. The results are shown in Table 1 below.

Determination of Elongation at Break

Tensile testing experiments are performed using a Zwick Allround-Line 10 kN machine (Zwick GmbH&Co, Germany). The experiments are performed using a Xforce HP load cell of 50 N (Zwick) with a screw grip with a maximal force of 20 N (type 8153). The strain is measured using a non-contact extensometer with an objective lens of 25 mm focal length. The applied test speed is kept at 100 mm/min during all experiments. Tensile bars are measured at room temperature and ambient humidity. All data are recorded with testXpert II software program (Zwick). The test specimen are punched with a cutting device according to ISO 527-2 type 5A from films obtained by drawing 400 mm wet films of clear formulations onto glass plates containing release paper. These films were allowed to dry for 4 hours under ambient conditions followed by ageing for 16 hours at 50° C. After removal of the films from the glass plate, at least 3 dumb bell shaped samples were cut. The thickness and width of these films were measured. The results are shown in Table 1 below.

TABLE 1

| | Polymer B | Containing Polymer A | König hardness (s) | Elongation at break (%) |
|---|---|---|---|---|
| Ex 1 | B1 | A1 | 84 | 290 |
| Ex 2 | B2 | A2 | 87 | 263 |
| Ex 3 | B3 | A2 | 126 | 189 |
| Ex 4 | B4 | A3 | 81 | 357 |
| Ex 5 | B5 | A4 | 84 | 350 |
| Ex 6 | B6 | A5 | 81 | Not determined |
| Comp Ex A | CB7 | CA6 | 78 | 138 |
| Comp Ex B | CB8 | CA7 | 73 | 149 |
| Ex 7 | B9 | A8 | 95 | Not determined |
| Ex 8 | B10 | A9 | 90 | 240 |

Comparing Comp Ex A with Comp Ex B shows that a gain in surface hardness in a film is traditionally offset by a reduction in the elastic properties of the film. Comparing Comp Ex B with Examples 1, 2, 4 and 5 (in all these experiments the $T_g$ of Polymer A is 100° C. and the $T_g$ of Polymer B is −20° C.) shows that surprisingly the elongation at break increases with at least 77% and even increases up to 140%, while this does not result in a decrease of König hardness but even more surprisingly the König hardness is even increased with at least 10%.

The invention claimed is:

1. A process for preparing an aqueous binder composition, the process comprising at least the following steps A) and B):
   A) preparing a carboxylic acid-functional vinyl polymer (polymer A) by emulsion polymerisation of a monomer composition A, wherein the monomer composition A comprises the following monomers:
      Ai) at least one carboxylic acid functional olefinically unsaturated monomer; and
      Aii) at least one olefinically unsaturated monomer different than the monomer Ai);
   B) preparing a vinyl polymer (polymer B) by emulsion polymerization of a monomer composition B in the presence of the polymer A wherein the monomer composition B comprises the following monomer(s):
      Bi) at least one olefinically unsaturated monomer;
      Bii) optionally carboxylic acid functional olefinically unsaturated monomer different than the monomer Bi); wherein
   the acid value of the polymer B is lower than the acid value of the polymer A; and wherein
   a weight average molecular weight (Mw) of the polymer B is higher than a weight average molecular weight (Mw) of the polymer A as determined by Size Exclusion Chromatography analysis; and wherein
   the polymers A and B are present in a weight ratio of the polymer A to the polymer B of from 5:95 to 95:5; and wherein
   at least part of the carboxylic acid groups of the polymer A are deprotonated to obtain ionic water-dispersing groups; and wherein
   the monomer composition A comprises at least two monomer compositions A1 and A2 which differ in chain-transfer agent concentration, wherein
   the monomer composition A1 comprises at most 1 wt. % of chain-transfer agent relative to the monomers in the total monomer composition A1, and the monomer composition A2 comprises at least 1 wt. % of chain-transfer agent and at most 3.5 wt. % of chain-transfer agent relative to the monomers in the total monomer composition A2, and wherein
   a difference in an amount of chain-transfer agent between the monomer composition A1 and the monomer composition A2 is at least 0.5 wt. %.

2. The process according to claim 1, wherein the monomer compositions A1 and A2 are fed sequentially to a polymerisation reactor.

3. The process according to claim 2, wherein the monomeric composition A1 is fed to the polymerisation reactor prior to the monomeric composition A2.

4. The process according to claim 1, wherein the polymer A has a gradient polymeric chain morphology having a continually changing polymeric composition along the polymeric chain.

5. The process according to claim 1, wherein the weight ratio of the monomer composition A1 to the monomer composition A2 is from 10:90 to 55:45.

6. The process according to claim 1, wherein the difference in amount of chain-transfer agent between the monomer composition A1 and the monomer composition A2 is at least 1 wt. %.

7. The process according to claim 1, wherein the chain-transfer agent is selected from the group consisting of mercaptans.

8. The process according to claim 1, wherein the chain-transfer agent is selected from the group consisting of lauryl mercaptan, 3-mercaptopropionic acid, 2-mercaptoethanol, isooctyl thioglycolate and mixtures thereof.

9. The process according to claim 1, wherein the monomer compositions A1 and A2 comprise the following monomers:
   Ai) from 5 to 15 wt. % of at least one carboxylic acid functional olefinically unsaturated monomer;
   Aii) from 85 to 95 wt. % of at least one olefinically unsaturated monomer different than Ai);
   Aiii) optionally at least one wet adhesion promoting olefinically unsaturated monomer different than Ai and Aii), in an amount of at most 6 wt. %; and
   Aiv) optionally at least one olefinically unsaturated monomer comprising crosslinkable groups, different than Ai), Aii) and Aiii), in an amount of at most 10 wt. %, wherein
   the amounts are given relative to the total weight of monomers contained in Polymer A and wherein the summed amount of Ai), Aii), Aiii) and Aiv) is 100 wt. %.

10. The process according to claim 1, wherein the monomer composition B comprises the following monomer(s):
    Bi) from 87 to 100 wt. % of at least one olefinically unsaturated monomer; and
    Bii) optionally carboxylic acid functional olefinically unsaturated monomer, different than Bi), in an amount of at most 3 wt. %; and
    Biii) optionally olefinically unsaturated monomer with wet adhesion promoting groups, different than Bi) and Bii), in an amount of less than 2.5 wt. %; and
    Biv) optionally olefinically unsaturated monomer comprising crosslinkable groups, different than Bi), Bii) and Biii), in an amount of less than 2.5 wt. %; wherein
    the amounts are given relative to the total weight of monomers contained in Polymer B and wherein the summed amount of Bi), Bii), Biii) and Biv) is 100 wt. %.

11. The process according to claim 1, wherein the polymer A has an acid value of from 45 to 65 mg KOH/g of solid polymer A and the polymer B has an acid value of 0 mg KOH/g of solid Polymer B.

12. The process according to claim 1, wherein
    a) the polymer A has a Tg from 70° C. to 125° C.; and
    b) the polymer B has a Tg from −20° C. to 0° C.

13. The process according to claim 1, wherein the polymer B has a weight average molecular weight (Mw) of at least 100,000 Daltons.

14. The process according to claim 1, wherein the polymer A has a weight average molecular weight (Mw) less than 50,000 Daltons.

15. The process according to claim 1, wherein the carboxylic acid functional olefinically unsaturated monomers Ai) and, if present Bii), are methacrylic acid.

16. The process according claim 1, wherein the monomers Aii) and Bi) are selected from the group consisting of acrylates, methacrylates, arylalkylenes and mixtures thereof.

17. The process according to claim 1, wherein the polymer A and the polymer B are present in a total amount which is at least 25 wt. % and at most 85 wt. %, relative to the total amount of binders in the aqueous binder composition.

18. An aqueous binder composition obtained by the process according to claim 1.

19. An aqueous coating composition comprising the aqueous binder composition according to claim 18.

20. A method of protective coating a substrate comprising the steps of:
   (1) applying the aqueous coating composition from claim 19 onto a substrate comprising a lignocellulosic material and/or aged alkyd resin and/or plastic and/or metallic substrate and/or composite materials comprising glass, to form a coating thereon, and
   (2) drying the coating.

* * * * *